United States Patent
Niinuma

(10) Patent No.: US 9,870,059 B2
(45) Date of Patent: Jan. 16, 2018

(54) HAND DETECTION DEVICE AND HAND DETECTION METHOD

(71) Applicant: FUJITSU LIMITED, Kawasaki-shi, Kanagawa (JP)

(72) Inventor: Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/559,014

(22) Filed: Dec. 3, 2014

(65) Prior Publication Data

US 2015/0234471 A1    Aug. 20, 2015

(30) Foreign Application Priority Data

Feb. 14, 2014    (JP) ................................. 2014-026020

(51) Int. Cl.
*G06F 3/01* (2006.01)
*G06K 9/46* (2006.01)
*G06K 9/00* (2006.01)

(52) U.S. Cl.
CPC ............ *G06F 3/017* (2013.01); *G06F 3/011* (2013.01); *G06K 9/0014* (2013.01); *G06K 9/00375* (2013.01); *G06K 9/00382* (2013.01); *G06K 9/00389* (2013.01); *G06K 9/4604* (2013.01); *G06K 9/4652* (2013.01)

(58) Field of Classification Search
CPC ........... G06K 9/00375; G06K 9/00382; G06K 9/00389; G06K 2009/00395; G06K 9/0014; G06K 9/4652; G06K 9/4604; G06F 3/017

See application file for complete search history.

(56) References Cited

U.S. PATENT DOCUMENTS

2008/0050015 A1*  2/2008  Lu ...................... G06K 9/00234
                                                          382/173
2012/0113241 A1   5/2012  Sundaresan et al.
(Continued)

FOREIGN PATENT DOCUMENTS

EP    2605180 A2    6/2013
JP    9-35066       2/1997
(Continued)

OTHER PUBLICATIONS

Niinuma et al., "Detecting Shade Regions based on the Contour Representation of an Image", *The Special Interest Group, Technical Reports of IPSJ*, 2001, pp. 1-8, vol. 36.
(Continued)

*Primary Examiner* — Xuemei Zheng
(74) *Attorney, Agent, or Firm* — Staas & Halsey LLP

(57) ABSTRACT

An image processing device includes a processor; and a memory which stores a plurality of instructions, which when executed by the processor, cause the processor to execute: acquiring an image which includes a first region and a second region of a user; detecting, from a group of candidate areas for the first region and the second region included in the image, the candidate area corresponding to the first region based on biometric characteristics of the first region; determining a connection direction between the first region and the second region based on outer edges of the candidate area corresponding to the first region; and selecting the candidate area corresponding to the second region from the group of candidate areas based on the connection direction.

17 Claims, 7 Drawing Sheets

(56) References Cited

U.S. PATENT DOCUMENTS

| | | | | |
|---|---|---|---|---|
| 2013/0135199 | A1* | 5/2013 | Perski | G06F 3/0425 345/156 |
| 2014/0307919 | A1* | 10/2014 | Yamashita | G06F 3/017 382/103 |
| 2014/0310271 | A1* | 10/2014 | Song | G06K 9/00288 707/732 |

FOREIGN PATENT DOCUMENTS

| | | |
|---|---|---|
| JP | 9-102046 | 4/1997 |
| JP | 2003-346162 | 12/2003 |
| JP | 2006-163662 | 6/2006 |

OTHER PUBLICATIONS

Vezhnevets et al., "A Survey on Pixel-Based Skin Color Detection Techniques", *In Proc Graphicon*, 2003, pp. 1-8.

Song et al., "A Hough transform based line recognition method utilizing both parameter space and image space", *The Journal of the Pattern Recognition Society*, 2005, pp. 539-552, vol. 38.

Zheng et al., "A Parallel-Line Detection Algorithm Based on HMM Decoding", *IEEE Transactions on Pattern Analysis and Machine Intelligence*, May 2005, pp. 777-792, vol. 27, No. 5.

Kakumanu et al., "A survey of skin-color modeling and detection methods", *The Journal of the Pattern Recognition Society*, 2007, pp. 1106-1122, vol. 40.

Elgammal et al., "Skin Detection—a Short Tutorial", *Encyclopedia of Biometrics*, 2009, pp. 1-10, Springer-Verlag, Berlin, Germany.

Senthilkumaran et al., "Edge Detection Techniques for Image Segmentation—A Survey of Soft Computing Approaches", *International Journal of Recent Trends in Engineering*, May 2009, pp. 250-254, vol. 1, No. 2.

Prema et al., "Survey on Skin Tone Detection using Color Spaces", *International Journal of Applied Information Systems (IJAIS)*, May 2012, pp. 18-26, vol. 2, No. 2.

Office Action issued by the European Patent Office dated Aug. 23, 2017 in corresponding European patent application No. 14 196 764.6.

Extended European Search Report dated Jul. 16, 2015 in related European Application No. 14196764.6.

Sudipta Roy et al., "Visual Image Based Hand Recognitions", Asian Journal of Computer Science and Information Technology, Feb. 2, 2011, pp. 106-110, XP055200728.

Ender Konukoğlu et al., "Shape-Based Hand Recognition", Proceedings of IEEE-SIU 2004, IEEE 12th Signal Processing and Telecommunication Applications Conference, Apr. 28, 2004, XP055200779, pp. 1-31.

Christopher Schwarz, "Detection, Segmentation, and Pose Recognition of Hands in Images", Apr. 4, 2006, XP055200947, pp. 1-28.

Ali Erol et al., "Vision-based hand pose estimation: A review", Computer Vision and Image Understanding, Academic Press, US, vol. 108, No. 1-2, Sep. 1, 2007, pp. 52-73, XP022227943.

\* cited by examiner

— : PARALLEL LINE SEGMENT
–·–·– : EXTENSION LINE OF PARALLEL LINE SEGMENT
⟶ : CONNECTION DIRECTION
⌐ ⌐ : CANDIDATE AREA CORRESPONDING TO FIRST REGION
⌐ ⌐ : GROUP OF CANDIDATE AREAS FOR SECOND REGION

⌐ ⌐ : CANDIDATE AREA CORRESPONDING TO FIRST REGION
▨ : GROUP OF CANDIDATE AREAS FOR SECOND REGION

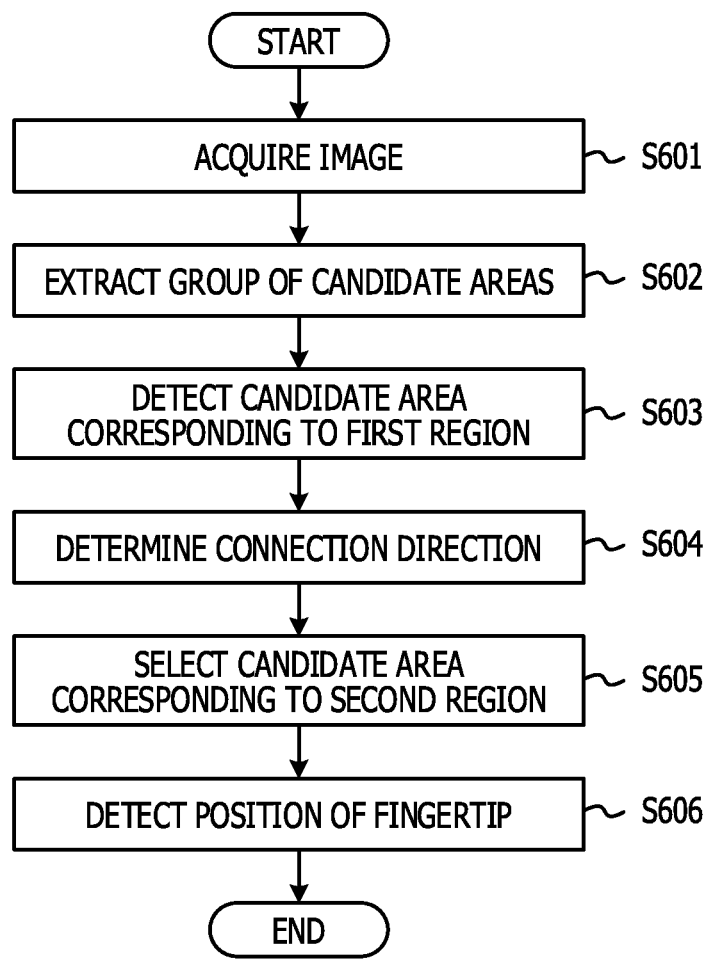

HAND DETECTION DEVICE AND HAND DETECTION METHOD

CROSS-REFERENCE TO RELATED APPLICATION

This application is based upon and claims the benefit of priority of the prior Japanese Patent Application No. 2014-026020, filed on Feb. 14, 2014, the entire contents of which are incorporated herein by reference.

FIELD

The embodiment discussed herein is related to, for example, an image processing device, image processing method, and image processing program used to detect a finger of a user.

BACKGROUND

In recent years, a technology has been developed to realize user operation support by, for example, making a user carry out interaction operation toward a projection image which is, by using a paper document and a projector, projected on the paper document. For example, an augmented reality (AR) technology has been disclosed in which, when a user points to a word on a paper document by his/her finger, a projection image associated with the word is projected, and, when the user further points to a portion of the projection image, notes or the like associated with the word are displayed.

In the above described interface, the position of a finger of the user has to be located accurately by using a camera fixed to an arbitrary position or a camera which is freely movable. As a method to locate the position of a finger, for example, a technology has been disclosed to extract a contour of a hand by extracting a color component (may be referred to as color feature amount) of the flesh color from an imaged image and to locate the position of the finger from the contour. As a technology of image processing as described above, for example, non-patent documents such as "Survey on Skin Tone Detection using Color Spaces, C. Prema et al., International Journal of Applied Information Systems 2(2):18-26, May 2012. Published by Foundation of Computer Science, New York, USA.", "Skin Detection—a Short Tutorial, Elgammal et al., Encyclopedia of Biometrics by Springer-Verlag Berlin Heidelberg 2009.", "A survey of skin-color modeling and detection methods, Kakumanu et al., Pattern Recognition, Volume 40, Issue 3, March 2007, Pages 1106-1122", and "A Survey on Pixel-Based Skin Color Detection Techniques, Vezhnevets et al., IN PROC. GRAPHICON-2003." have been disclosed.

SUMMARY

In accordance with an aspect of the embodiments, an image processing device includes a processor; and a memory which stores a plurality of instructions, which when executed by the processor, cause the processor to execute: acquiring an image which includes a first region and a second region of a user; detecting, from a group of candidate areas for the first region and the second region included in the image, the candidate area corresponding to the first region based on biometric characteristics of the first region; determining a connection direction between the first region and the second region based on outer edges of the candidate area corresponding to the first region; and selecting the candidate area corresponding to the second region from the group of candidate areas based on the connection direction.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 6 is a flowchart of the image processing carried out by the image processing device 1.

DESCRIPTION OF EMBODIMENTS

Hereinafter, examples of an image processing device, image processing method, and image processing program according to an embodiment will be described with reference to the accompanying drawings. The examples, however, do not limit disclosed technologies.

Example 1

Figure 1:
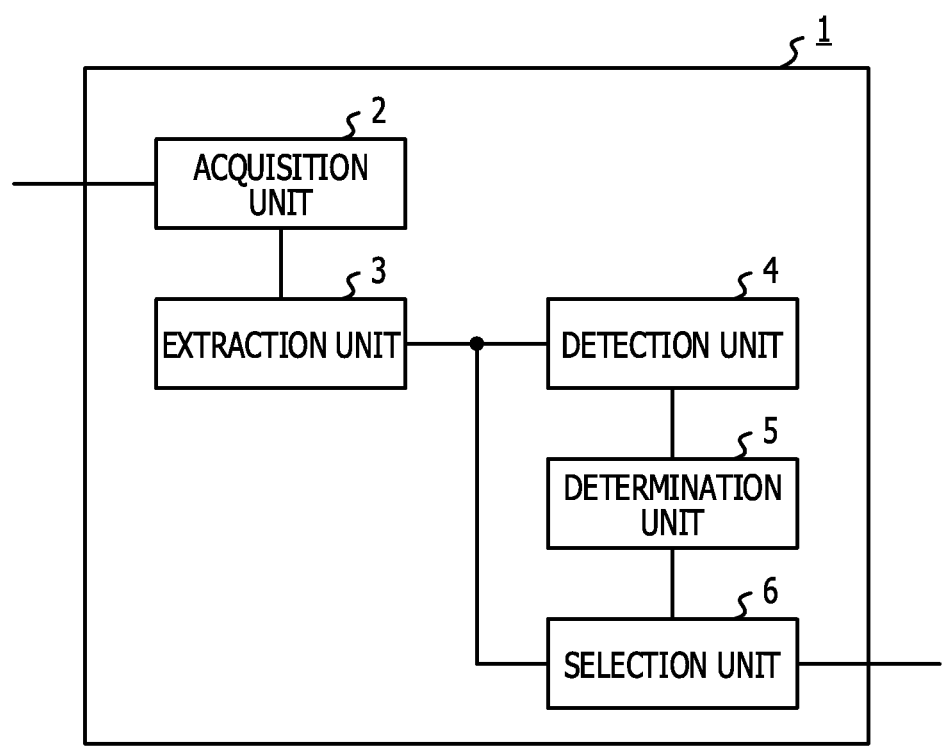
FIG. 1 is a functional block diagram of an image processing device 1 according to an embodiment.

FIG. 1 is a functional block diagram of an image processing device 1 according to an embodiment. The image processing device 1 includes an acquisition unit 2, extraction unit 3, detection unit 4, determination unit 5, and selection unit 6. The image processing device 1 also includes a not-illustrated communication unit, and may use network resources by transmitting and receiving data bi-directionally to and from various external devices via a communication channel.

The acquisition unit 2, for example, is a hardware circuit configured with a wired logic. The acquisition unit 2 may also be a function module implemented by a computer program executed on the image processing device 1. The acquisition unit 2 receives an image imaged by an external device. The external device imaging the image is, for example, an image sensor. The image sensor is, for example, an imaging device such as a charge coupled device (CCD) and a complementary metal oxide semiconductor (CMOS) camera. When the image received from the image sensor is an analog image, the acquisition unit 2 may convert the analog image into a digital image through sampling, by which analog signals are extracted at discrete positions, and then quantization, by which the analog signals are converted to numerical values with finite resolution. The acquisition unit 2 may also acquire the image by, for example, issuing instructions of imaging with an interval of 30 fps to the image sensor. The image sensor may be used as a head mounted camera (HMC). The image sensor, for example, images an image including a first region and second region of a user. The image sensor may also be included in the image processing device 1 as appropriate. The first example will be described, for the purpose of illustration, on the assumption that the first region is a region including the dorsum of hand (may be referred to as the back of the hand) and a portion from the second joint to the third joint of a finger, and the second region is a region located in the direction from the second joint to the fingertip of a finger. If the second region is expressed in other words, regions located in the direction from the second joint to the fingertip of a finger include, for example, a region from the fingertip to the second joint, a region from the first joint to the second joint, and a region from the fingertip to the first joint. The first example will also be described, for the purpose of illustration, on the assumption that the dorsum of hand and a finger are in a state of facing the image sensor (in other words, in a state of being opposite to the image sensor), and, a finger (for example, index finger) is in a state of being spread to carry out interaction operation. The acquisition unit 2 outputs the acquired image to the extraction unit 3.

The extraction unit 3, for example, is a hardware circuit configured with a wired logic. The extraction unit 3 may also be a function module implemented by a computer program executed on the image processing device 1. The extraction unit 3 receives the image from the acquisition unit 2. The extraction unit 3 may, from the viewpoint of processing load reduction, distinguish flesh-colored areas from non-flesh-colored areas in the image, and exclude the non-flesh-colored areas from a series of image processing targets. The first example, for the purpose of illustration, will be described on the assumption that the extraction unit 3 distinguishes flesh-colored areas from non-flesh-colored areas in the image, and excludes the non-flesh-colored areas from a series of image processing targets. A flesh-colored area may be determined on any color space such as RGB, HSV, and YCbCr. For example, when the RGB color space is used, the methods to distinguish a flesh-colored area include a method to determine a flesh-colored area based on whether or not the pixel value of each color component of RGB (may be referred to as color feature quantity) is within an arbitrary range (for example, 100<R<255, 0<G<70, and 0<B<70), a method to determine a flesh-colored area by every pixel value (for example, when pixel values are (R1, G1, B1), the pixel is decided to be in a flesh-colored area, and, when pixel values are (R2, G2, B2), the pixel is decided to be in a non-flesh-colored area), and so on. The RGB, HSV, and YCbCr color spaces may be interconverted with one another, and it thus becomes possible to determine a flesh-colored area on other color spaces in the same manner as on the above-described RGB color space.

The extraction unit 3 receives the image from the acquisition unit 2 and extracts a group of candidate areas for the first region and second region of a user included in the image based on pixel values in the image. In other words, the extraction unit 3, for example, extracts a group of candidate areas based on a predetermined first pixel value which is determined based on differences between pixel values of adjacent pixels in the image and by which the first region and second region are extracted separately. Specifically, the extraction unit 3 separates pixels included in the flesh-colored area into a plurality of areas (a group of candidate areas for the first region and second region). The extraction unit 3 may, for example, extract a group of candidate areas by using differences between pixel values of adjacent pixels in the flesh-colored area. When it is assumed that (Ra, Ga, Ba) and (Rb, Gb, Bb) denote pixel values of adjacent pixels A and B, respectively, a difference between the pixel values (may be referred to as distance) D_ab may be expressed by the following formula.

$$D\_ab = \sqrt{((Ra-Rb)^2+(Ga-Gb)^2+(Ba-Bb)^2)} \quad \text{(Formula 1)}$$

The extraction unit 3, when the difference between pixel values D_ab is less than a predetermined first pixel value (for example, a first pixel value of 5) in the above (formula 1), extracts the areas as candidate areas in an identical group, and, when the difference between pixel values D_ab is equal to or greater than the threshold value, extracts the areas as candidate areas in different groups.

Figure 2A:
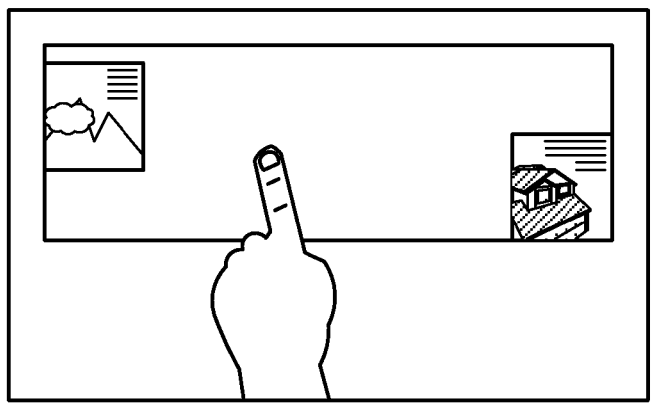
FIG. 2A illustrates an example of an image which an acquisition unit 2 acquires.
Figure 2B:
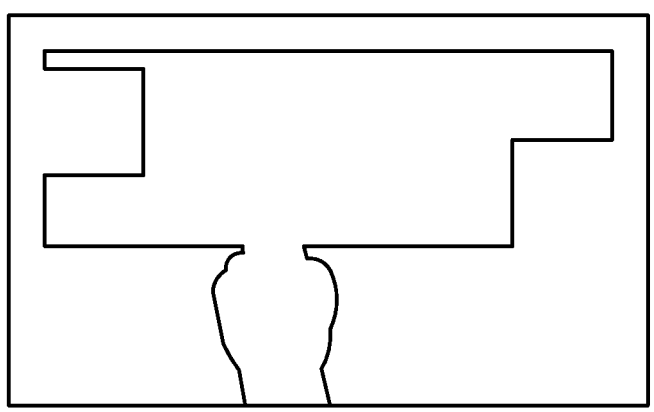
FIG. 2B illustrates an example of a flesh-colored area which an extraction unit 3 extracts from the image.
Figure 2C:
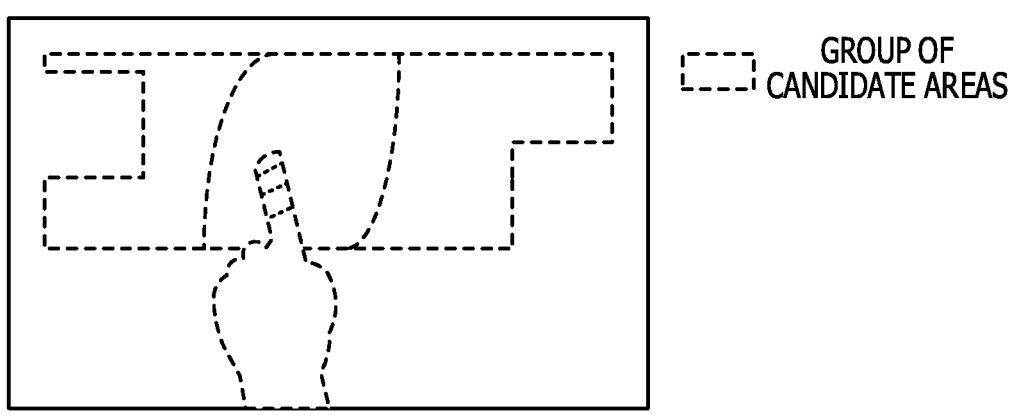
FIG. 2C illustrates an example of a group of candidate areas for a first region and second region which the extraction unit 3 extracts based on differences between pixel values of adjacent pixels in the flesh-colored area.

FIG. 2A illustrates an example of an image which the acquisition unit 2 acquires. FIG. 2B illustrates an example of a flesh-colored area which the extraction unit 3 extracts from the image. FIG. 2C illustrates an example of a group of candidate areas for the first region and second region which the extraction unit 3 extracts based on differences between pixel values of adjacent pixels in the flesh-colored area. In FIG. 2A, the image which the acquisition unit 2 acquires includes the first region and second region of a user which overlap a plane of paper including information such as a photograph and the flesh-colored background. As illustrated in FIG. 2A, the dorsum of hand and a finger (index finger) of the user are in a state of facing the image sensor, and, the finger is in a state of being spread straight to carry out interaction operation. As illustrated in FIG. 2B, the extraction unit 3 may, by using the method disclosed above, extract the flesh-colored area included in the image. In FIG. 2B, the first region and second region of the user and the background area of the plane of paper are extracted as a flesh-colored area. The extraction unit 3, by using the method disclosed above, extracts the group of candidate areas for the first region and second region from the flesh-colored area based on differences between pixel values of adjacent pixels. In FIG. 2C, the first region is extracted as a candidate area in a group, and the second region is extracted as a plurality of candidate areas in a state of being separated into a plurality of groups. The background area of the plane of paper is also extracted as candidate areas in a state of being separated into a plurality of groups. This is because pixel values of the plane of paper, for example, vary under the influence of surface reflection of light.

A condition which determines the first pixel value based on differences between pixel values of adjacent pixels will be described below. The first pixel value may be any pixel value by which the first region, second region, and background area are extracted separately. The idea of the first pixel value is an idea which is newly revealed through consistent study by the applicants and has not been previously disclosed. In an image including the dorsum of hand and a finger, because regions including wrinkles of skin existing on the first joint and second joint of a finger or nails have complex shapes, differences between pixel values of adjacent pixels have pixel values peculiar to the regions.

On the other hand, because the dorsum of hand and the region including a portion from the second joint to the third joint of a finger carrying out interaction operation do not have substantially peculiar shapes, there is little difference between pixel values of adjacent pixels. Hence, the extraction unit 3 may determine a predetermined second pixel value (for example, a second pixel value of 7), which makes it possible to separate the first region from the second region, in advance. Boundary portions between the first region and second region and the background area have differences between pixel values of adjacent pixels, which are peculiar to the boundary regions, due to influence of shade of light even when the background area is a flesh-colored area. Therefore, the extraction unit 3 may determine a predetermined third pixel value (for example, a third pixel value of 5), which makes it possible to separate the first region and second region from the background area, in advance. In this processing, the first pixel value may be determined by a process in which the second pixel value and the third pixel value are compared, and the smaller one (the value which makes it possible both to separate the first region from the second region and to separate the first region and second region from the background area) is determined as the first pixel value. By using the first pixel value, the extraction unit 3 may extract a group of candidate areas for the first region and second region from the areas corresponding to the first region and second region and the area other than the areas corresponding to the first region and second region (background area).

The extraction unit 3 may extract the group of candidate areas for the first region and second region based on, for example, an edge extraction method disclosed in "N. Senthilkumaran et al., Edge Detection Techniques for Image Segmentation, A Survey of Soft Computing Approaches, International Journal of Recent Trends in Engineering, Vol. 1, No. 2, May 2009". The extraction unit 3 outputs the extracted group of candidate areas to the detection unit 4 and selection unit 6.

The detection unit 4 illustrated in FIG. 1 is, for example, a hardware circuit configured with a wired logic. The detection unit 4 may also be a function module implemented by a computer program executed on the image processing device 1. The detection unit 4 receives the group of candidate areas from the extraction unit 3. The detection unit 4 detects a candidate area corresponding to the first region from the group of candidate areas based on biometric characteristics of the first region. The biometric characteristics, for example, may include at least one of the area, shape, and statistic of pixel values of the first region. The detection unit 4 outputs the detected candidate area for the first region to the determination unit 5. Details of detection processing in the detection unit 4 with respect to each biometric characteristic of the first region will be described below. The detection unit 4, however, may detect a candidate area corresponding to the first region by combining individual biometric characteristics in order to improve robustness.

(Method to Detect the Candidate Area Corresponding to the First Region Based on the Area of the First Region)

The detection unit 4 detects the candidate area corresponding to the first region based on the area of the first region, which is an example of biometric characteristics. When the area of each candidate area in the group of candidate areas received from the extraction unit 3 is denoted by Sn (the unit may, for example, be the number of pixels), the detection unit 4 may detect the candidate area corresponding to the first region based on the following formula.

$$TH01 < Sn < TH02 \quad \text{(Formula 2)}$$

In the above (formula 2), however, TH01 and TH02 denote arbitrary threshold values, which may be determined by measuring in advance a typical first region of a single user or a plurality of users who use(s) the image processing device 1. For example, when it is assumed that the size of an image the acquisition unit 2 acquires is 76800 pixels (320 pixels×240 pixels), and the distance between the image sensor and the first region is 50 cm, TH01 and TH02 may be determined to have values of 2000 pixels and 10000 pixels, respectively. When the detection unit 4 detects a plurality of candidate areas corresponding to the first region which satisfy the condition expressed by the above (formula 2), for example, the detection unit 4 may detect a candidate area that has the area value closest to the mean value of TH01 and TH02 as the candidate area corresponding to the first region.

(Method to Detect the Candidate Area Corresponding to the First Region Based on the Shape of the First Region)

The detection unit 4 detects a candidate area corresponding to the first region based on the shape of the first region, which is an example of biometric characteristics. The detection unit 4 may detect the candidate area corresponding to the first region by carrying out any type of template matching between the outer edges of each candidate area in the group of candidate areas and, for example, the outer edges of a pre-measured first region(s) of a single user or a plurality of users. The detection unit 4 may also detect the candidate area corresponding to the first region by detecting parallel line segments of the outer edges of candidate areas in the group of candidate areas (because the width of a finger is substantially invariable, the outer edges at the left end and the right end of the finger constitute parallel line segments) and selecting a candidate area the detected parallel line segments of which are shorter than or equal to a predetermined threshold value (the threshold value may be appropriately defined based on the length from the second joint to the third joint of a finger). The detection unit 4 may use, as the method to detect parallel line segments, a method disclosed in, for example, "Zheng et. al., A Parallel-Line Detection Algorithm Based on HMM Decoding, IEEE TRANSACTIONS ON PATTERN ANALYSIS AND MACHINE INTELLIGENCE, VOL. 27, NO. 5, May 2005" or "Song et. al., A Hough transform based line recognition method utilizing both parameter space and image space, Pattern Recognition, 38, 2005, p. 539-p. 552". When the detection unit 4 detects a plurality of candidate areas corresponding to the first region which satisfy the above-described condition, for example, the detection unit 4 may detect a candidate area which has a highest degree of similarity to the template or a candidate area the parallel line segment length of which is closest to the predetermined threshold value as the candidate area corresponding to the first region.

(Method to Detect the Candidate Area Corresponding to First Region Based on Statistics of Pixel Values)

The detection unit 4 detects the candidate area corresponding to the first region based on a statistic of pixel values of the first region, which is an example of biometric characteristics. The detection unit 4 may detect the candidate area corresponding to the first region by using the average pixel value (Ar, Ag, Ab) and standard deviation ($\sigma r$, $\sigma g$, $\sigma b$) (for example, on the RGB color space) of each candidate area in the group of candidate areas received from the extraction unit 3, based on the following formulae.

$$TH03 < Ar < TH04$$

$$TH05 < Ag < TH06$$

$$TH07 < Ab < TH08$$

$$TH09 < \sigma r < TH10$$

$$TH11 < \sigma g < TH12$$

$$TH13 < \sigma b < TH14 \qquad \text{(Formulae 3)}$$

In the above (formulae 3), TH03 to TH14 denote arbitrary threshold values which may be determined by measuring a typical first region of a single user or a plurality of users who use(s) the image processing device 1, in advance. For example, each threshold value may be determined as: TH03=170; TH04=200; TH05=60; TH06=120; TH07=110; TH08=160; TH09=5; TH10=15; TH11=10; TH12=30; TH=13; and TH14=30.

A technical reason for which the detection unit 4 may detect the candidate area corresponding to the first region based on a statistic of pixel values, which is an example of biometric characteristics, will be described below. The dorsum of hand and the area from the second joint to the third joint include minuscule portions with slightly different colors (may be referred to as color characteristic quantity), such as a slightly reddish portion, a slightly whitish portion, and a slightly blackish portion (above a blood vessel or the like). Hence, the standard deviation of pixel values in the dorsum of hand and the area from the second joint to the third joint is larger than those on the plane of paper with a single color of the flesh color, which is an example of the background. It is possible for the detection unit 4 to use variance in place of standard deviation. When the detection unit 4 detects a plurality of candidate areas corresponding to the first region which satisfy the conditions expressed by the above (formulae 3), for example, the detection unit 4 may detect a candidate area the average pixel value of which is closest to the mean value of TH03 and TH04 or TH09 and TH 10 as the candidate area corresponding to the first region.

Figure 3:
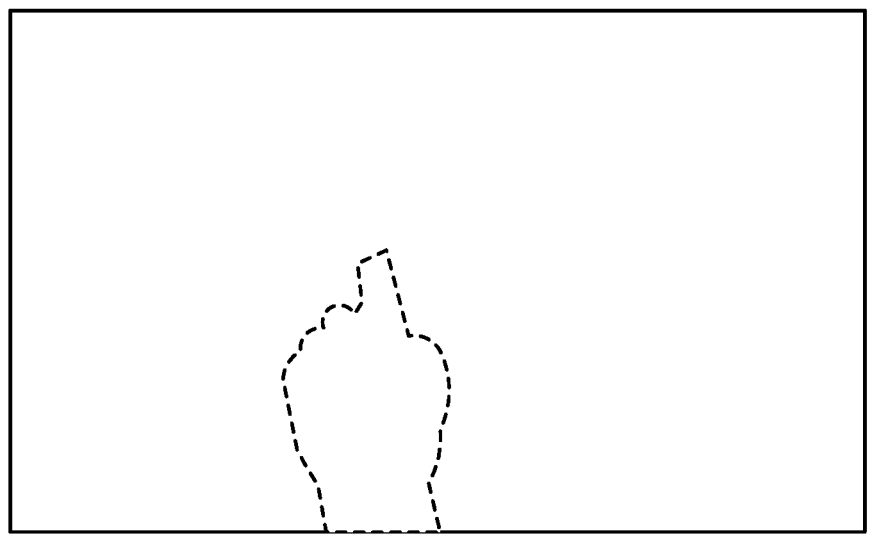
FIG. 3 illustrates an example of a candidate area corresponding to the first region which a detection unit 4 detects.

FIG. 3 illustrates an example of the candidate area corresponding to the first region which the detection unit 4 detects. As illustrated in FIG. 3, the detection unit 4 detects the candidate area corresponding to the first region from the group of candidate areas illustrated in FIG. 2C based on biometric characteristics of the first region. The detection unit 4 outputs the detected candidate area corresponding to the first region to the determination unit 5.

The determination unit 5 illustrated in FIG. 1 is, for example, a hardware circuit configured with a wired logic. The determination unit 5 may be a function module implemented by a computer program executed on the image processing device 1. The determination unit 5 receives, from the detection unit 4, the candidate area corresponding to the first region detected by the detection unit 4. The determination unit 5 determines a connection direction between the first region and the second region based on the outer edges of the candidate area for the first region.

First, the determination unit 5 detects outer edges from the candidate area corresponding to the first region. The determination unit 5 may use various well-known methods as a method to detect outer edges. The determination unit 5 may use, as a method to detect outer edges, a method disclosed in, for example, "Song et. al., A Hough transform based line recognition method utilizing both parameter space and image space, Pattern Recognition, 38, 2005, p. 539-p. 552". Next, the determination unit 5 detects parallel line segments from the detected outer edges. The parallel line segments, for example, correspond to the outer edges of the portion from the second joint to the third joint of the finger (because the width of a finger is substantially invariable, the outer edges at the left end and right end of the finger constitute parallel line segments). The determination unit 5 may use, as a method to detect parallel line segments, a method disclosed in, for example, "Zheng et. al., A Parallel-Line Detection Algorithm Based on HMM Decoding, IEEE TRANSACTIONS ON PATTERN ANALYSIS AND MACHINE INTELLIGENCE, VOL. 27, NO. 5, May 2005" or "Niinuma et. al., Detecting Shading Regions based on the Contour Representation of an Image, The Special Interest Group Technical Reports of IPSJ, 2001, 36, p 1-8". Although the width of a finger is substantially invariable, the outer edges of the finger are not parallel in a precise sense. As a result, the determination unit 5 may use any threshold decision method in detection of parallel line segments. The threshold value may be determined by measuring an angle made by the outer edges at the left end and right end of a typical finger of a single user or a plurality of users who use(s) the image processing device 1. For example, the determination unit 5 may decide that two line segments are parallel line segments if the angle made by the two line segments is less than 5°. In this case, the determination unit 5 may define completely parallel line segments by correcting the gradient of each of two line segments decided to be parallel with, for example, the quotient of the angle made by the two line segments divided by 2. When the determination unit 5 detects a plurality of parallel line segments (in other words, when parallel line segments of portions from the second joints to the third joints of the thumb and the index finger are detected), for example, the determination unit 5 may regard the longest parallel line segments as the finger by which the user is carrying out interactive operation.

Figure 4:
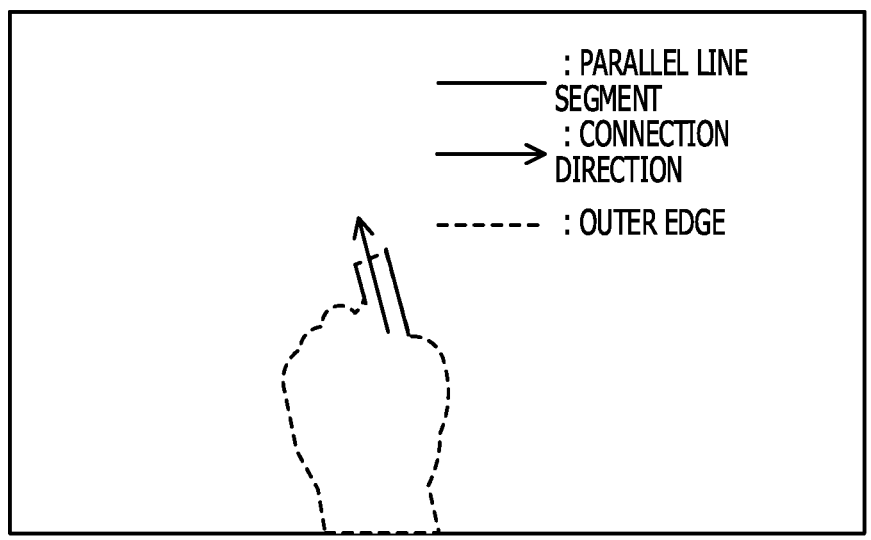
FIG. 4 illustrates an example of a connection direction which a determination unit 5 determines.

FIG. 4 illustrates an example of a connection direction which the determination unit 5 determines. As illustrated in FIG. 4, the determination unit 5 determines parallel line segments from the outer edges and further determines the connection direction from the parallel line segments. It is sufficient for the connection direction to be, for example, parallel with the parallel line segments. When, for example, the upper left corner of the image acquired by the acquisition unit 2 is the origin, the horizontal direction is denoted by x, and the vertical direction is denoted by y, the determination unit 5 may determine information expressed by y=ax+b (a and b are arbitrary coefficients) as the connection direction. The information may be referred to as an extension line of the median line of the parallel line segments. The determination unit 5 outputs the determined connection direction between the first region and second region to the selection unit 6.

The selection unit 6 illustrated in FIG. 1, for example, is a hardware circuit configured with a wired logic. The selection unit 6 may be a function module implemented by a computer program executed on the image processing device 1. The selection unit 6 receives the connection direction from the determination unit 5 and the group of candidate areas from the extraction unit 3. The selection unit 6 selects candidate areas corresponding to the second region based on the connection direction from the group of candidate areas excluding the candidate area corresponding to the first region. The selection unit 6, for example, selects candidate areas corresponding to the second region based on distances between the extension line of the median line of the parallel line segments and outer edges of the group of candidate areas or areas between extension lines of the parallel line segments. Furthermore, the selection unit 6, for example, selects candidate areas corresponding to the second region further based on the areas of the group of candidate areas or pixel values of the first region and the group of candidate areas. Details of the selection processing by the selection unit 6 will be described below. The selection unit 6 may, however, detect candidate areas corresponding to the second region by combining selection processing methods in order to improve robustness.

Figure 5A:
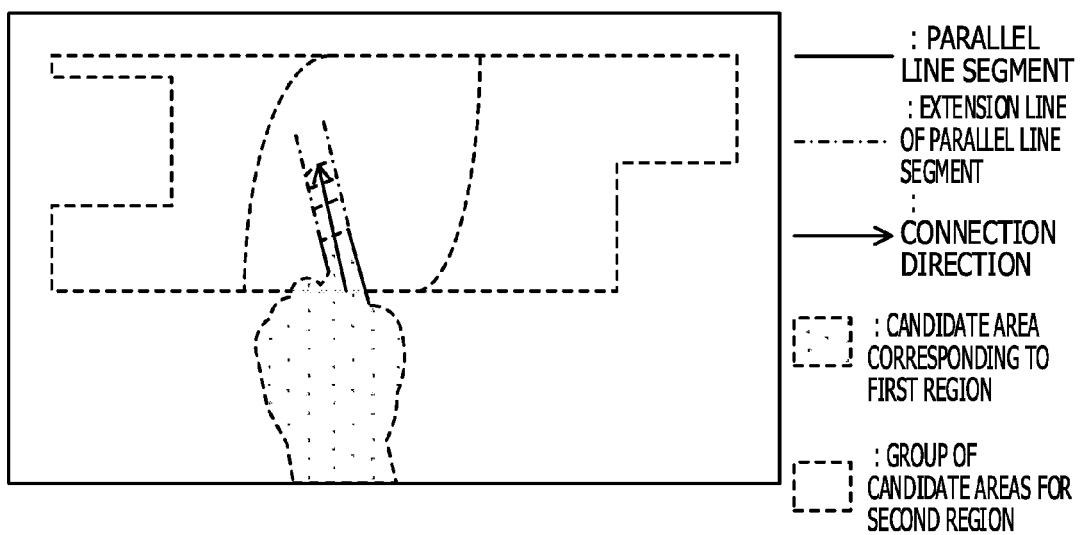
FIG. 5A is a diagram illustrating the candidate area corresponding to the first region and the connection direction thereof and a group of candidate areas for the second region.
Figure 5B:
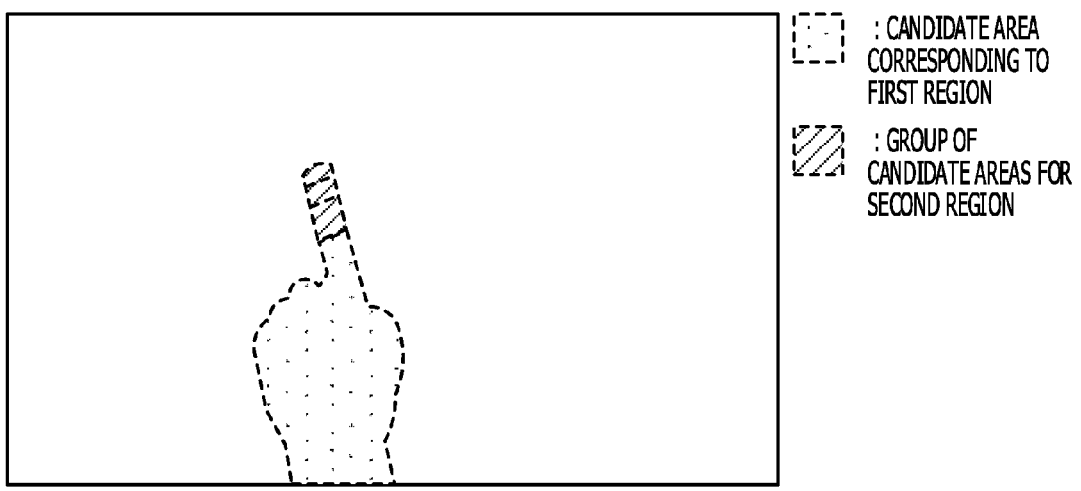
FIG. 5B is a diagram illustrating the candidate area corresponding to the first region detected by the detection unit 4 and the candidate areas corresponding to the second region selected by a selection unit 6.

FIG. 5A is a diagram illustrating the candidate area corresponding to the first region and the connection direction thereof and a group of candidate areas for the second region. FIG. 5B is a diagram illustrating the candidate area corresponding to the first region detected by the detection unit 4 and the candidate areas corresponding to the second region selected by the selection unit 6. In FIG. 5A, the connection direction between the first region and the second region (may be referred to as an extension line of the median line of parallel line segments), the parallel line segments, and extension lines of the parallel line segments are illustrated. The selection unit 6, for example, selects candidate areas existing in the connection direction as candidate areas corresponding to the second region. The selection unit 6, for example, may also select candidate areas corresponding to the second region based on areas between the extension lines of the parallel line segments. This selection processing uses a biometric characteristic in that outer edges of regions from the fingertip to the first joint to the second joint to the third joint (outer edges of a finger) constitute substantially straight lines.

The selection unit 6 illustrated in FIG. 1 may select candidate areas corresponding to the second region based on, for example, a distance B_distance (the unit may, for example, be the number of pixels) between extension lines of the parallel line segments and outer edges of the group of candidate areas (for example, distance between the extension line of the median line of the parallel line segments and a point on the outer edges that is furthest from the extension line of the median line of the parallel line segments). The selection unit 6 may, for example, select candidate areas that satisfy a condition expressed by the following formula as the candidate areas corresponding to the second region.

$$B\_distance < TH15 \qquad \text{(Formula 4)}$$

In the above (formula 4), TH15 is an arbitrary threshold value which is determined by measuring in advance a typical second region of a single user or a plurality of users who use(s) the image processing device 1. For example, TH15 may be 10. By applying the above (formula 4), it becomes possible to avoid selecting, as a candidate area corresponding to the second region, a candidate area with an oblong shape which does not correspond to a finger shape from among candidate areas existing on the extension line of the median line of the parallel line segments.

The selection unit 6 may, for example, select candidate areas corresponding to the second region based on an area B_area (the unit may, for example, be the number of pixels) of a candidate area in the group of candidate areas. The selection unit 6 may, for example, select a candidate area that satisfies a condition expressed by the following formula as a candidate area corresponding to the second region.

$$TH16 < B\_area < TH17 \qquad \text{(Formula 5)}$$

In the above (formula 5), TH16 and TH17 are arbitrary threshold values which are determined by measuring in advance a typical second region of a single user or a plurality of users who use(s) the image processing device 1. For example, TH16 and TH17 may be 2 and 300, respectively. By applying the above (formula 5), it becomes possible to avoid selecting, as a candidate area corresponding to the second region, a candidate area with too large area or a candidate area with too small area to correspond to a finger shape from among candidate areas existing on the extension line of the median line of the parallel line segments. TH16 may be determined based on the area of minuscule areas produced by shade of light.

The selection unit 6 may, for example, select a candidate area corresponding to the second region based on an average value B_ave and standard deviation B_σ of pixel values of each candidate area in the group of candidate areas and an average value A_ave and standard deviation A_σ of pixel values of the candidate area corresponding to the first region. The selection unit 6 may, for example, select a candidate area that satisfies a condition expressed by the following formula as a candidate area corresponding to the second region.

$$|B\_ave - A\_ave| < TH18$$

$$|B\_\sigma - A\_\sigma| < TH19 \qquad \text{(Formula 6)}$$

In the above (formula 6), TH18 and TH19 are arbitrary threshold values which are determined by measuring a typical first region and second region of a single user or a plurality of users who use(s) the image processing device 1 in advance. For example, TH18 and TH19 may be 20 and 5, respectively. TH18 and TH19 may be determined based on a biometric characteristic in that pigments of adjacent skin areas resemble each other.

As illustrated in FIG. 5B, the image processing device 1 (for example, the selection unit 6) may regard a concatenation of the candidate area corresponding to the first region detected by the detection unit 4 and the candidate areas corresponding to the second region selected by the selection unit 6 as a finger of the user, and detect a position of the fingertip from the outer edge (contour) of the finger by an arbitrary method. The image processing device 1 may use, as a method to detect a position of the fingertip, a method disclosed in, for example, "Survey on Skin Tone Detection using Color Spaces, C. Prema et al., International Journal of Applied Information Systems 2(2):18-26, May 2012. Published by Foundation of Computer Science, New York, USA.". The image processing device 1 outputs the detected position of the fingertip to an external device (for example, an information processing terminal device or the like).

The image processing device 1 may, for example, be configured with integrated circuits such as an application specific integrated circuit (ASIC) and field programmable gate array (FPGA).

FIG. 6 is a flowchart of the image processing carried out by the image processing device 1. The acquisition unit 2, for example, receives, from the image sensor, an image imaged by the image sensor which includes at least the first region and second region of a user (step S601). In step S601, when the image received from the image sensor is an analog image, the acquisition unit 2 may convert the analog image into a digital image through sampling, by which analog signals are extracted at discrete positions, and then quantization, by which the analog signals are converted to numerical values with finite resolution. The acquisition unit 2 may also acquire the image by, for example, issuing instructions of imaging with an interval of 30 fps to the image sensor. The following description will be done on the assumption that the first region is a region including the dorsum of hand (may be referred to as the back of the hand) and a portion from the second joint to the third joint of a finger, and the second region is a region located in the direction from the second joint to the fingertip of the finger. The description will also be done, for the purpose of illustration, on the assumption that the dorsum of hand and the finger are in a state of facing the image sensor (in other words, in a state of being opposite to the image sensor), and, a finger (for example, index finger) is in a state of being spread to carry out interaction operation. The acquisition unit 2 outputs the acquired image to the extraction unit 3.

The extraction unit 3 receives the image from the acquisition unit 2, and extracts a group of candidate areas for the first region and second region of the user included in the image based on pixel values in the image (step S602). In other words, the extraction unit 3, for example, extracts a group of candidate areas based on a predetermined first pixel value which is determined based on differences between pixel values of adjacent pixels in the image and by which the first region and the second region are extracted separately. Specifically, the extraction unit 3 separates pixels included in a flesh-colored area into a plurality of areas (a group of candidate areas for the first region and second region). The extraction unit 3, for example, extracts the group of candidate areas by using differences between pixel values of adjacent pixels in the flesh-colored area and the above-described processing method of the extraction unit 3. Though not illustrated, when, in step S602, no group of candidate areas is extracted, the acquisition unit 2 may acquire an image at a different moment (for example, the next frame) (step S601), and the extraction unit 3 may carry out the processing in step S602 again.

Furthermore, in step S602, the extraction unit 3 may, from the viewpoint of processing load reduction, distinguish flesh-colored areas from non-flesh-colored areas in the image by using the above-described processing method of the extraction unit 3, and exclude the non-flesh-colored areas from a series of image processing targets. In the description of the flowchart illustrated in FIG. 6, for the purpose of illustration, it is assumed that the extraction unit 3 distinguishes the flesh-colored area from the non-flesh-colored areas in the image and excludes the non-flesh-colored areas from a series of image processing targets. The extraction unit 3 outputs the extracted group of candidate areas to the detection unit 4 and selection unit 6.

The detection unit 4 receives the group of candidate areas from the extraction unit 3. The detection unit 4, by using the above-described processing method of the detection unit 4, detects the candidate area corresponding to the first region from the group of candidate areas based on biometric characteristics of the first region (step S603). The biometric characteristics may, for example, include at least one of the area, the shape, and a statistic of pixel values of the first region. The detection unit 4 outputs the detected candidate area for the first region to the determination unit 5.

The determination unit 5 receives, from the detection unit 4, the candidate area corresponding to the first region detected by the detection unit 4. The determination unit 5, based on the outer edges of the candidate area for the first region, determines the connection direction between the first region and the second region by using the above-described processing method of the determination unit 5 (S604). In step S602, when the determination unit 5 detects a plurality of parallel line segments (in other words, when parallel line segments of portions from the second joints to the third joints of the thumb and the index finger are detected), for example, the determination unit 5 may regard the longest parallel line segments as the finger by which the user is carrying out interactive operation. The determination unit 5 outputs the determined connection direction between the first region and the second region to the selection unit 6.

The selection unit 6 receives the connection direction from the determination unit 5 and the group of candidate areas from the extraction unit 3. The selection unit 6, based on the connection direction, selects candidate areas corresponding to the second region from the group of candidate areas excluding the candidate area corresponding to the first region by using the above-described processing method of the selection unit 6 (step S605). The selection unit 6, for example, selects candidate areas corresponding to the second region based on distances between the extension line of the median line of the parallel line segments and the outer edges of the group of candidate areas or areas between extension lines of the parallel line segments. Furthermore, the selection unit 6, for example, selects candidate areas corresponding to the second region further based on the area of the group of candidate areas or pixel values of the first region and the group of candidate areas. In step S605, the selection unit 6 may, in order to improve robustness, detect a candidate area corresponding to the second region by combining the above-described selection processing methods.

The image processing device 1 (for example, the selection unit 6) regards a concatenation of the candidate area corresponding to the first region detected by the detection unit 4 and the candidate areas corresponding to the second region selected by the selection unit 6 as a finger of the user, and detects a position of the fingertip from the outer edge (contour) of the finger by an arbitrary method (step S606). With this processing, the image processing device 1 ends the image processing illustrated in the flowchart of FIG. 6.

With the image processing device of the example 1, it becomes possible to locate a position of a finger of a user accurately without being influenced by a background color. Although a case in which a hand is flesh-colored, the background is also flesh-colored, and the processing methods for these portions are similar has been described as an example in the example 1, embodiments are not limited to this case. For example, it will be appreciated that the embodiment described in the example 1 is also applicable to a case in which fingers are covered by a glove and a background with a similar color to the color of the glove is used.

Example 2

Figure 7:
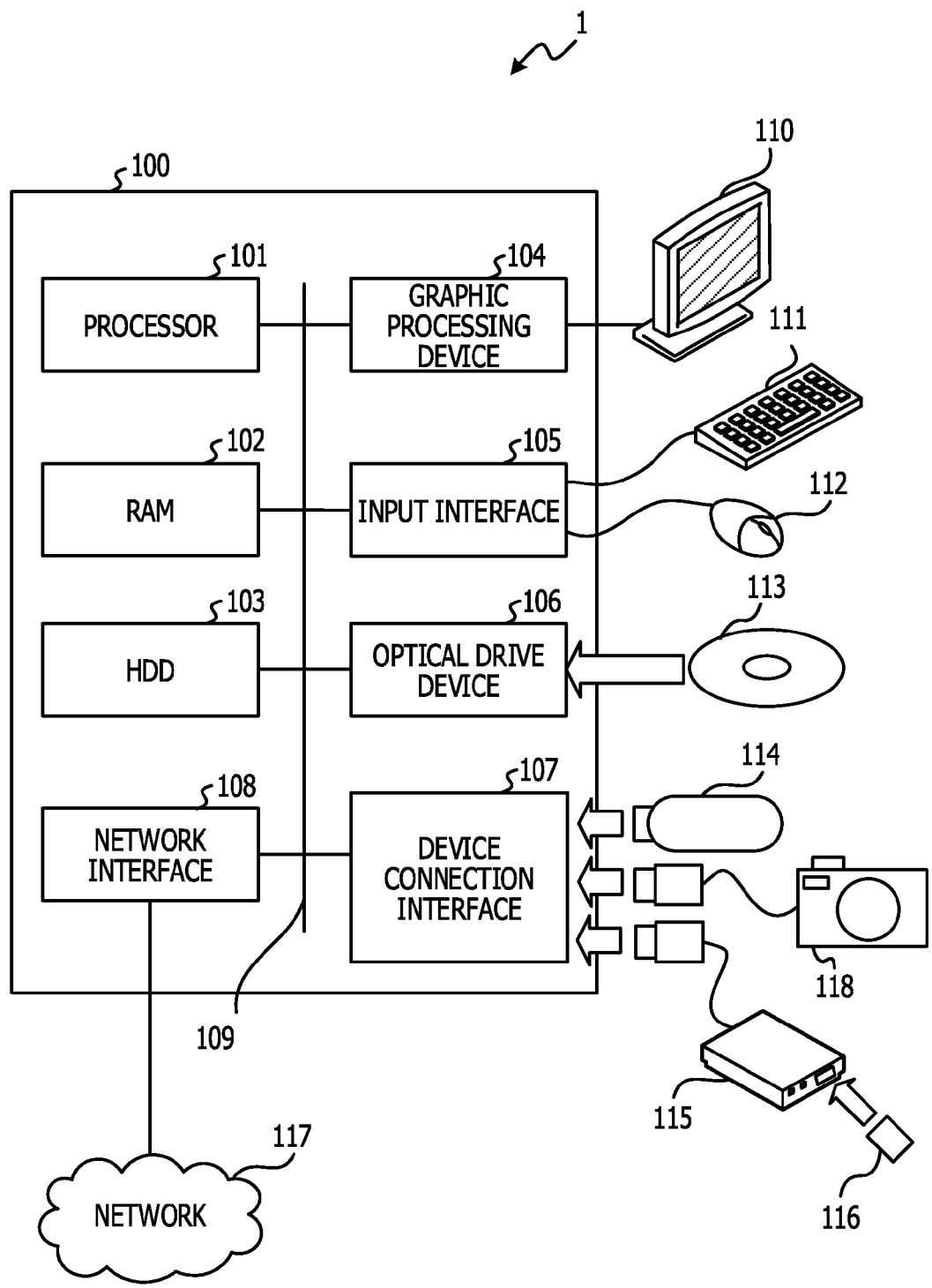
FIG. 7 is a hardware configuration diagram of the image processing device 1 according to the embodiment.

FIG. 7 is a hardware configuration diagram of a computer which functions as an image processing device 1 according to an embodiment. As illustrated in FIG. 7, the image processing device 1 is configured with a computer 100 and input/output devices (peripheral devices) connected to the computer 100.

The whole computer 100 is controlled by a processor 101. To the processor 101, a random access memory (RAM) 102 and a plurality of peripheral devices are connected via a bus 109. The processor 101 may be a multiprocessor. The processor 101 is, for example, a CPU, micro processing unit (MPU), digital signal processor (DSP), application specific integrated circuit (ASIC), or programmable logic device (PLD). Moreover, the processor 101 may be a combination of two or more components among a CPU, MPU, DSP, ASIC, and PLD. The processor 101 may, for example, carry out processing of function blocks such as an acquisition unit 2, extraction unit 3, detection unit 4, determination unit 5, and selection unit 6 in FIG. 1.

The RAM 102 is used as a main memory of the computer 100. To the RAM 102, at least a portion of operating system (OS) programs and application programs, which are executed by the processor 101, are stored temporarily. To the RAM 102, various kinds of data, which is used in processing executed by the processor 101, are also stored.

Peripheral devices connected to the bus 109 include a hard disk drive (HDD) 103, graphic processor unit 104, input interface 105, optical drive unit 106, device connection interface 107, and network interface 108.

The HDD 103 carries out data writing and reading magnetically to and from an internal disk. The HDD 103, for example, is used as an auxiliary storage device for the computer 100. To the HDD 103, OS programs, application programs, and various kinds of data are stored. Semiconductor memory devices such as a flash memory may also be used as an auxiliary storage device.

To the graphic processing device 104, a monitor 110 is connected. The graphic processing device 104, following instructions from the processor 101, makes the monitor 110 display various images on a display thereof. A display device using a cathode ray tube (CRT) and a liquid crystal display device may be used for the monitor 110.

To the input interface 105, a keyboard 111 and a mouse 112 are connected. The input interface 105 transmits signals transmitted from the keyboard 111 and mouse 112 to the processor 101. The mouse 112 is just an example of a pointing device. Other types of pointing devices may be used. The other types of pointing devices include a touch panel, tablet, touch pad, trackball and the like.

The optical drive unit 106 reads out data recorded in the optical disk 113 by using a laser beam or the like. The optical disk 113 is a portable recording medium on which data are recorded so as to be readable by the reflection of light. The optical disk 113 includes a digital versatile disc (DVD), DVD-RAM, compact disc read only memory (CD-ROM), compact disc-recordable (CD-R), compact disc-rewritable (CD-RW), or the like. Programs stored in the optical disk 113, which is a portable recording medium, are installed in the image processing device 1 via the optical drive unit 106. The installed pre-arranged programs become executable on the image processing device 1.

The device connection interface 107 is a communication interface to connect peripheral devices to the computer 100. For example, to the device connection interface 107, a memory device 114, memory reader/writer 115, and image sensor 118 may be connected. The memory device is a recording medium equipped with a communication function with the device connection interface 107. The memory reader/writer 115 is a device configured to write data to a memory card 116, or to read out data from the memory card 116. The memory card 116 is a card-type recording medium. The image sensor 118 is, for example, an imaging device such as a charge coupled device (CCD) and complementary metal oxide semiconductor (CMOS) camera. The image sensor 118, for example, images an image including the first region and second region of a user.

The network interface 108 is connected to a network 117. The network interface 108 transmits and receives data to and from another computer or communication device via the network 117.

The computer 100, for example, accomplishes the above-described image processing function by executing programs recorded in a computer-readable recording medium. The programs describing processing details executed by the computer 100 may be recorded in various recording media. The above-described programs may be configured with one or a plurality of function modules. For example, the programs may be configured with function modules that accomplish the processing of the acquisition unit 2, extraction unit 3, detection unit 4, determination unit 5, and selection unit 6 illustrated in FIG. 1. The programs executed by the computer 100 may be stored in the HDD 103. The processor 101 loads at least a portion of the programs stored in the HDD 103 into the RAM 102 and executes the programs. The programs executed by the computer 100 may also be recorded in a portable recording medium such as the optical disk 113, memory device 114, and memory card 116. The programs stored in a portable recording medium, for example, are installed in the HDD 103 under the control of the processor 101, and then become executable. The processor 101 may directly read out the programs from the portable recording medium and execute the programs.

Individual components of the illustrated units do not have to be physically configured as illustrated. In other words, specific manner of configuration of the individual units such as distributed configuration or integrated configuration is not limited to the illustrated ones, and the whole or part of the components may be functionally or physically configured in a distributed manner or integrated manner in any unit in accordance with various levels of load and usage conditions. The various types of processing described in the above examples may be implemented by executing pre-arranged programs on a computer such as a personal computer and workstation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising:
a memory; and
a processor, coupled to the memory, configured to:
acquire an image which includes a first region and a second region of a user, the first region corresponding to a dorsum of a hand of the user and a portion from a second joint to a third joint of a finger of the hand, the second region corresponding to a region from a fingertip to the second joint of the finger of the hand;
detect, from a plurality of candidate areas for the first region and the second region included in the image, a first candidate area corresponding to the first region based on a predetermined image feature of the first region and based on an image feature corresponding to wrinkles of skin on a first joint and the second joint of the finger extracted from the image, the predetermined image feature including at least a statistic of pixel values of the first region;
determine parallel line segments included in outer edges of the first candidate area; and
select a second candidate area corresponding to the second region from the plurality of candidate areas based on the parallel line segments.

2. The device according to claim 1, wherein the processor is further configured to:
extract the plurality of candidate areas for the first region and the second region included in the image based on pixel values in the image.

3. The device according to claim 2,
wherein the processor is further configured to extract the plurality of candidate areas based on a predetermined first pixel value which is determined based on differences between the pixel values of adjacent pixels in the image and by which the first region and the second region are extracted separately.

4. The device according to claim 1,
wherein the processor is further configured to determine a connection direction between the first region and the second region based on the parallel line segments.

5. The device according to claim 4,
wherein the processor is further configured to select the candidate area corresponding to the second region based on a distance between extension lines of the parallel line segments and the outer edges or based on an area between the extension lines of the parallel line segments.

6. The device according to claim 4,
wherein the processor is further configured to select the candidate area corresponding to the second region based on an area of the plurality of candidate areas or the pixel values of the first region and the plurality of candidate areas.

7. The device according to claim 1,
wherein the predetermined image feature further includes at least one of an area of the first region and a shape of the first region.

8. The device according to claim 1, wherein the processor is further configured to select the second candidate area corresponding to the second region from the plurality of candidate areas based on the parallel line segments by selecting a candidate area in which the parallel line segments are shorter than or equal to a predetermined threshold value.

9. The device according to claim 1, wherein the processor is further configured to detect the first candidate area corresponding to the first region by using an average pixel value and standard deviation on the RGB color space of each of the candidate areas.

10. An image processing method comprising:
acquiring an image which includes a first region and a second region of a user, the first region corresponding to a dorsum of a hand of the user and a portion from a second joint to a third joint of a finger of the hand, the second region corresponding to a region from a fingertip to the second joint of the finger of the hand;
detecting, from a plurality of candidate areas for the first region and the second region included in the image, a first candidate area corresponding to the first region based on a predetermined image feature of the first region and based on an image feature corresponding to wrinkles of skin on a first joint and the second joint of the finger extracted from the image, the predetermined image feature including at least a statistic of pixel values of the first region;
determining, by a computer processor, parallel line segments included in outer edges of the first candidate area; and
selecting a second candidate area corresponding to the second region from the plurality of candidate areas based on the parallel line segments.

11. The method according to claim 10, further comprising:
extracting the plurality of candidate areas for the first region and the second region included in the image based on pixel values in the image.

12. The method according to claim 11,
wherein the extracting includes extracting the plurality of candidate areas based on a predetermined first pixel value which is determined based on differences between the pixel values of adjacent pixels in the image and by which the first region and the second region are extracted separately.

13. The method according to claim 10,
wherein the determining includes determining a connection direction between the first region and the second region based on the parallel line segments.

14. The method according to claim 13,
wherein the selecting includes selecting the candidate area corresponding to the second region based on a distance between extension lines of the parallel line segments and the outer edges or based on an area between the extension lines of the parallel line segments.

15. The method according to claim 13,
wherein the selecting includes selecting the candidate area corresponding to the second region further based on an area of the plurality of candidate areas or the pixel values of the first region and the plurality of candidate areas.

16. The method according to claim 10,
wherein the predetermined image feature further includes at least one of an area of the first region and a shape of the first region.

17. A non-transitory computer-readable storage medium storing an image processing program that causes a computer to execute a process comprising:
acquiring an image which includes a first region and a second region of a user, the first region corresponding to a dorsum of a hand of the user and a portion from a second joint to a third joint of a finger of the hand, the second region corresponding to a region from a fingertip to the second joint of the finger of the hand;
detecting, from a plurality of candidate areas for the first region and the second region included in the image, a first candidate area corresponding to the first region based on a predetermined image feature of the first region and based on an image feature corresponding to wrinkles of skin on a first joint and the second joint of the finger extracted from the image, the predetermined image feature including at least a statistic of pixel values of the first region;
determining parallel line segments included in outer edges of the first candidate area; and
selecting a second candidate area corresponding to the second region from the plurality of candidate areas based on the parallel line segments.

* * * * *